Feb. 5, 1952 S. C. HETH 2,584,204
CORN SNAPPING AND HUSKING ROLLS
Filed March 1, 1946 2 SHEETS—SHEET 1

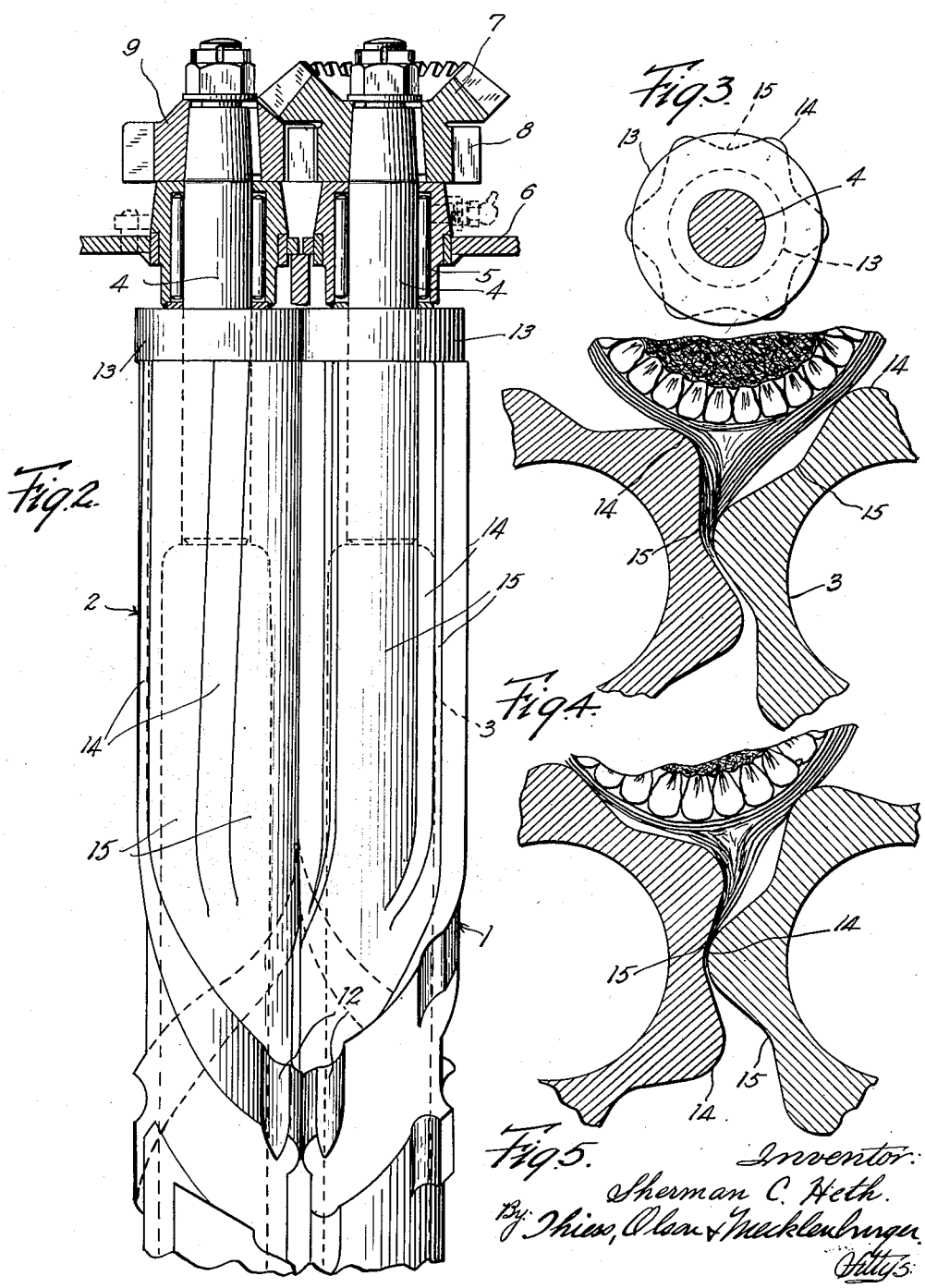

Patented Feb. 5, 1952

2,584,204

UNITED STATES PATENT OFFICE 2,584,204

CORN SNAPPING AND HUSKING ROLLS

Sherman C. Heth, Racine, Wis., assignor to J. I. Case Company, Racine, Wis., a corporation of Wisconsin Application March 1, 1946, Serial No. 651,184

3 Claims. (Cl. 130—5)

The present invention relates to improvements in the snapping rolls of corn picking machines and has special reference to the husking portions thereof located adjacent the upper or rear ends of the rolls.

Snapping rolls are arranged in pairs and pass on opposite sides of a row of corn. As the corn picking machine advances, the rolls feed the stalks downwardly and rearwardly, remove the ears of corn therefrom and husk them. The ears usually are snapped on the lower portions of the rolls and then propelled upwardly to the husking portions where they lie generally longitudinally of the rolls while being husked.

To accomplish the husking operation efficiently while keeping any shelling of the ears or other injury to a minimum, the husking portions of the rolls are provided with axially extending, intermeshing rounded grooved ridges, the rolls being so arranged that the peripheries of the husking portions are substantially in contact at all times. By having the husking portions of the rolls substantially in contact the husks are rapidly and positively fed between them and because of the rounded peripheries thereof the ears of corn are husked with a minimum of shelling.

The primary object of the present invention is to provide improved snapping rolls having husking portions which will efficiently husk the ears of corn with a minimum of shelling or other damage thereto.

A further object of the present invention is to provide snapping rolls with the husking portions thereof formed with substantially axially extending, intermeshing, rounded grooves and ridges which are substantially in contact at all times thus resulting in a smooth rolling contact.

Further objects and advantages will be apparent from the following specification and claims when considered in conjunction with the drawings, in which latter:

Fig. 2 is a fragmentary view of the husking portions of the rolls;

Fig. 3 is an end view of the upper end of one of the snapping rolls;

Fig. 4 is a fragmentary cross-sectional view showing the intermeshing husking portions of the rolls in one position with an ear of corn being husked thereby;

Figs. 5, 6 and 7 are views similar to Fig. 4, showing the rolls in successively advanced positions from that shown in Fig. 4.

Referring more particularly to the drawings, there is shown a pair of snapping rolls 1 and 2 embodying the present invention. These snapping rolls may be employed in a single-row corn picker or in a two-row corn picker in which two pairs of snapping rolls are provided, one for each of two rows of corn. The pairs of rolls are so arranged that as the corn picker passes through a cornfield the stalks of a row will pass between each pair of snapping rolls.

Figure 1:
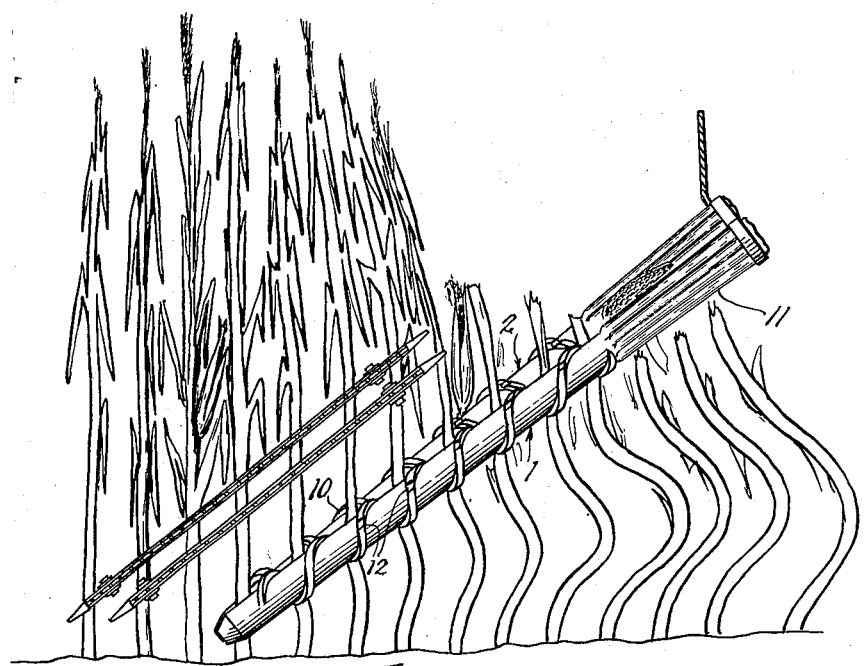
Figure 1 is a side elevational view of a pair of snapping rolls embodying the present invention and the gathering chains employed therewith.

The rolls 1 and 2 are mounted on a corn picking machine with the lower ends thereof substantially level but with the outer roll 2 preferably inclined slightly more than the inner roll 1 so that at their upper ends the outer roll is above the inner roll as shown in Fig. 1.

In order to reduce the weight of the rolls they are preferably made hollow with a central longitudinal opening 3. At the upper end of the roll the central opening 3 is reduced in diameter for the reception of a shaft 4 which is fixedly secured therein by any suitable means. The lower ends of the rolls may be rotatably mounted on gudgeons carried by the corn picking machine.

The shafts 4 are rotatably supported by roller bearings 5 carried on a support 6 of the corn picking machine. Rotation of the snapping rolls is provided by a bevel gear 7 driven by a bevel gear on the power supply of the machine. A spur gear 8 connected to or made integral with the bevel gear 7 meshes with a similar spur gear 9 on the other roll so that the snapping rolls rotate at the same speed in opposite directions. The direction of rotation is such that the rolls of a pair rotate inwardly toward each other at the top and outwardly away from each other at the bottom.

Each of the snapping rolls is provided with a spiral ridge 10 extending from adjacent the lower ends of the rolls to the husking portions 11. In the arrangement shown, the spiral ridge 10 on roll 1 has a left-hand spiral and the spiral ridge on the roll 2 has a similar right-hand spiral. The spirals may be positioned to be substantially in contact at all times. As roll 1 which is the inner roll rotates in a clockwise direction and the outer roll 2 rotates in a counterclockwise direction, the rolls tend to feed the stalks of corn downwardly and rearwardly while the machine is advancing. For this purpose the peripheral speed of the rolls is greater than would be required merely to compensate for the forward advance of the machine. In fact, it is preferably sufficient to insure that the stalks, which are generally quite a bit taller than the height of the rolls, will be forced downwardly and rearwardly bewteen the rolls before reaching the upper ends of the rolls.

During the operation of the machine the parts of the rolls below the husking portions remove most of the ears from the stalks. This action may be increased by providing notches 12 in the spiral ridges 10. The ears are then propelled upwardly by the rolls to the husking portions thereof.

The husking portions of the rolls are shown particularly in Figs. 2 through 7. They extend from the upper ends of the helical ridges 10 to the spacing hubs or collars 13 provided on the upper ends of the rolls. Each husking portion consists of similar substantially axially extending ridges 14 and intermediate grooves or depressions 15. The grooves and ridges are rounded and, in cross section, have what might be called a substantially sinusoidal periphery about the center of each of the rolls. The rolls are arranged so that the husking portions intermesh, with a ridge on one roll being opposite a groove or depression on the other. The centers of the rolls are so spaced that the husking portions of the rolls are substantially in contact. However, the rolls may be forced slightly apart to accommodate the husks and any broken pieces of stalks therebetween.

Figures 6, 7:
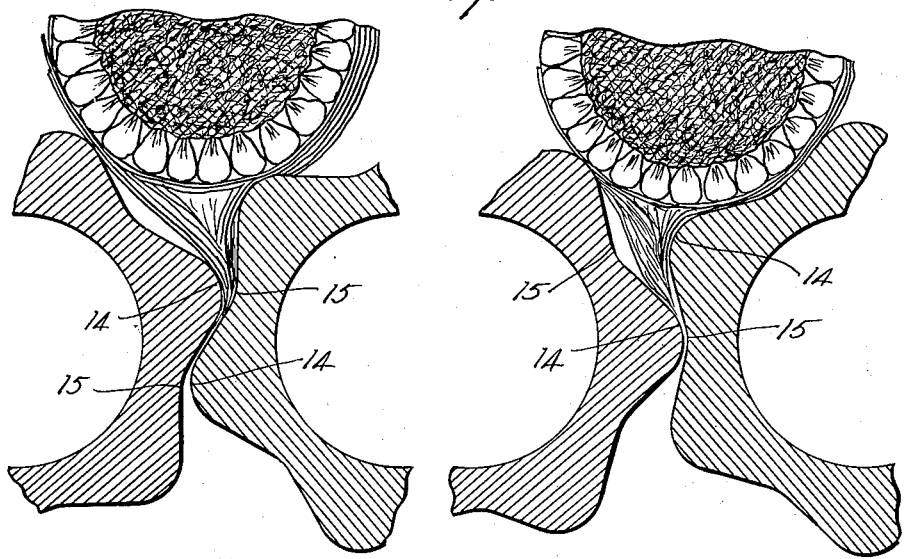

In the particular arrangement shown, the ridges 14 of the snapping portions of the rolls and likewise the depressions therebetween are sixty degrees apart, there being six ridges and six depressions about the periphery of each roll. Starting with Fig. 4, Fig. 5 shows the snapping rolls after they have advanced fifteen degrees; Fig. 6 shows the rolls advanced fifteen degrees from the position shown in Fig. 5; and Fig. 7 shows a further advance of fifteen degrees from the position shown in Fig. 6. It may sometimes be desirable to increase or decrease the number of ridges on the rolls. In Figs. 4–7, incl., which shows successive steps in a 45 degree rotation of the rolls, it will be noted that the peripheries of the two rolls are almost in contact with each other along lines lying in a plane through the axes of the rolls and that the sum of the radii of the rolls lying in a line perpendicular to the axes of the rolls is substantially equal to the distance between the axes.

Due to the rounded peripheries of the ridges and grooves of the husking portions, there is a rolling contact between them which, while tightly gripping the husks therebetween to positively feed them through the rolls, does not cause appreciable shelling.

As shown in Figs. 5 and 7, the axial cross section of the rolls is such that when the crest of a groove adjacent and underneath and cradling an ear lies in a vertical plane through the axis of the roll, the other crest of this groove will lie adjacent a vertical plane through the line of closest proximity of the two rolls whereby, as shown in Fig. 5, the left-hand underneath side of the ear may be rockably cradled in the upper right-hand groove of the left-hand roller and, as shown in Fig. 7, the right-hand underneath side of the ear may be rockably cradled in the upper left-hand groove of the right-hand roller. The ear is thus rocked and rolled back and forth from side to side from one roll to the other. The husks are pulled from the ear as it is rocked and rolled back and forth.

As the snapping rolls of a pair are at a slight angle to each other, the ridges on one of the rolls should be given a slightly helical shape to compensate for this. Referring to Fig. 2, the inner roll 1 has axially extending ridges while in the outer roll 2, which rotates in a counterclockwise direction, the ridges 14 have a slight right-hand spiral.

In order to disclose clearly the particular embodiment of the present invention illustrated in the drawings, the cross sectional views of the husking portions of the rolls, Figs. 4 to 7, inclusive, have been drawn substantially to scale with a root diameter of $2^{19}/_{32}''$ and a crest diameter of $3\frac{5}{16}''$. Such husking portions have proved very satisfactory. However, other dimensions may be used.

While I have shown a particular design and arrangement of the snapping rolls, it is to be understood that various changes and modifications may be made therein without departing from the present invention. I therefore wish to be limited only by the prior art and the scope of the appended claims.

I claim:

1. In a corn picker machine, a pair of synchronously driven upwardly and rearwardly inclined rotatable combined husking, stalk guiding and snapping rolls having substantially parallel axes, the lower stalk guiding and ear snapping portions of the rolls having means for engaging stalks and feeding them rearwardly and downwardly with respect to the rolls as they rotate, the upper husking portions of said rolls having substantially axially-extending intermeshing rounded ridges and rounded grooves forming smooth uninterrupted undulating surfaces, the central portions of the ridges of each roll being brought successively into juxtaposition with respect to the central portions of the grooves of the other roll, the surfaces of each groove being shaped to conform in general to the general cylindrical surface of an ear of corn, the radii of each roll which lie in a plane perpendicular to the axis of said roll decreasing gradually and continuously from the central portion of each ridge to the central portion of each groove and increasing gradually and continuously from the central portion of each groove to the central portion of each ridge, said rolls being so spaced and shaped that the peripheries of said portions are in close proximity at all times along lines lying in a plane through the axes of said rolls and out of close proximity above and below said planes, a line between a point in the axis of one roll perpendicular to the axis of the other roll at its lower end being substantially horizontal, the space above the husking portions of the rolls being free and unobstructed to enable free rotation of the ear about its axis under the husking and peeling action of the juxtaposed central portions of the grooves and ridges, the surface of each groove lying substantially in a cylindrical surface having a radius of curvature substantially equal to the radius of curvature of the cylindrical surface of an ear of corn whereby when the ear is medially positioned in said groove the entire surface of the groove will be in substantially uniform proximity to the ear of corn, the cross-sectional contour of the rolls being such that when one crest of a groove underneath and adjacent and cradling an ear lies in a vertical plane through the axis of a roll, the other crest of this groove will lie adjacent a vertical plane through the line of closest proximity of the two rolls whereby the ear may be rocked back and forth from side to side from one roll to the other and the husks may be pulled from the ear as the rolls are rotated.

2. In a corn husking machine, a pair of synchronously driven rotatable husking rolls having substantially parallel axes having substantially axially-extending intermeshing rounded ridges and rounded grooves forming smooth uninterrupted undulating surfaces, the central portions of the ridges of each roll being brought successively into juxtaposition with respect to the central portions of the grooves of the other roll, the surfaces of each groove being shaped to conform in general to the general cylindrical surface of an ear of corn, the radii of each roll which lie in a plane perpendicular to the axis of said roll decreasing gradually and continuously from the central portion of each ridge to the central portion of each groove and increasing gradually and continuously from the central portion of each groove to the central portion of each ridge, said rolls being so spaced and shaped that the peripheries of said portions are in close proximity at all times along lines lying in a plane through the axes of said rolls and out of close proximity above and below said planes, the space above the husking portions of the rolls being free and unobstructed to enable free rotation of the ear about its axis under the husking and peeling action of the juxtaposed central portions of the grooves and ridges, the surface of each groove lying substantially in a cylindrical surface having a radius of curvature substantially equal to the radius of curvature of the cylindrical surface of an ear of corn whereby when the ear is medially positioned in said groove the entire surface of the groove will be in substantially uniform proximity to the ear of corn, the cross-sectional contour of the rolls being such that when one crest of a groove underneath and adjacent and cradling an ear lies in a vertical plane through the axis of a roll, the other crest of this groove will lie adjacent a vertical plane through the line of closest proximity of the two rolls whereby the ear may be rocked back and forth from side to side from one roll to the other and the husks may be pulled from the ear as the rolls are rotated.

3. In a corn picking machine, a pair of synchronously driven upwardly and rearwardly inclined rotatable combined husking, stalk guiding and snapping rolls having substantially parallel axes, the upper husking portions of said rolls having substantially axially-extending intermeshing rounded ridges and rounded grooves forming smooth uninterrupted undulating surfaces, the central portions of the ridges of each roll being brought successively into juxtaposition with respect to the central portions of the grooves of the other roll, the surfaces of each groove being shaped to conform in general to the general cylindrical surface of an ear of corn, the radii of each roll which lie in a plane perpendicular to the axis of said roll decreasing gradually and continuously from the central portion of each ridge to the central portion of each groove and increasing gradually and continuously from the central portion of each groove to the central portion of each ridge, said rolls being so spaced and shaped that the peripheries of said portions are in close proximity at all times along lines lying in a plane through the axes of said rolls and out of close proximity above and below said planes, a line between a point in the axis of one roll perpendicular to the axis of the other roll at its upper end being inclined, the space above the husking portions of the rolls being free and unobstructed to enable free rotation of the ear about its axis under the husking and peeling action of the juxtaposed central portions of the grooves and ridges, the surface of each groove lying substantially in a cylindrical surface having a radius of curvature substantially equal to the radius of curvature of the cylindrical surface of an ear of corn whereby when the ear is medially positioned in said groove the entire surface of the groove will be in substantially uniform proximity to the ear of corn, the cross-sectional contour of the rolls being such that when one crest of a groove underneath and adjacent and cradling an ear lies in a vertical plane through the axis of a roll, the other crest of this groove will lie adjacent a vertical plane through the line of closest proximity of the two rolls whereby the ear may be rocked back and forth from side to side from one roll to the other and the husks may be pulled from the ear as the rolls are rotated.

SHERMAN C. HETH.

REFERENCES CITED

The following references are of record in the file of this patent:

UNITED STATES PATENTS

| Number | Name | Date |
|---|---|---|
| 535,024 | Rosenthal | Mar. 5, 1895 |
| 729,438 | Steel | May 26, 1900 |
| 770,888 | Benjamin | Sept. 27, 1904 |
| 787,750 | Goodhue | Apr. 18, 1905 |
| 808,264 | Vandegrift | Dec. 26, 1905 |
| 839,472 | Goodhue | Dec. 25, 1906 |
| 901,989 | McDole et al. | Oct. 27, 1908 |
| 1,225,806 | Gronke | May 15, 1917 |
| 1,635,569 | Ayars | July 12, 1927 |
| 2,180,594 | Kuhlman | Nov. 21, 1939 |
| 2,329,768 | Kerr | Sept. 21, 1943 |
| 2,489,495 | Morral | Nov. 29, 1949 |